United States Patent
Day et al.

(10) Patent No.: US 6,728,767 B1
(45) Date of Patent: Apr. 27, 2004

(54) REMOTE IDENTIFICATION OF CLIENT AND DNS PROXY IP ADDRESSES

(75) Inventors: Mark Day, Milton, MA (US); Gang Lu, Belmont, MA (US); Barbara Liskov, Waltham, MA (US); James O'Toole, Cambridge, MA (US)

(73) Assignee: Cisco Technology, Inc., San Jose, CA (US)

( * ) Notice: Subject to any disclaimer, the term of this patent is extended or adjusted under 35 U.S.C. 154(b) by 313 days.

(21) Appl. No.: 09/642,143

(22) Filed: Aug. 18, 2000

(51) Int. Cl.[7] ............................................. G06F 15/173
(52) U.S. Cl. ........................ 709/223; 709/224; 709/245
(58) Field of Search ................................. 709/223, 224, 709/245

(56) References Cited

U.S. PATENT DOCUMENTS

| | | | | |
|---|---|---|---|---|
| 5,712,979 A | * | 1/1998 | Graber et al. ................ | 709/224 |
| 5,764,910 A | * | 6/1998 | Shachar ....................... | 709/223 |
| 6,052,718 A | | 4/2000 | Gifford ........................ | 809/219 |
| 6,092,100 A | * | 7/2000 | Berstis et al. ............... | 709/203 |
| 6,300,863 B1 | * | 10/2001 | Cotichini et al. ............ | 340/5.8 |
| 6,332,158 B1 | * | 12/2001 | Risley et al. ................ | 709/219 |
| 6,345,294 B1 | | 2/2002 | O'Toole et al. ............. | 709/222 |
| 6,505,254 B1 | * | 1/2003 | Johnson et al. ............. | 709/239 |
| 6,513,061 B1 | * | 1/2003 | Ebata et al. ................. | 709/203 |
| 6,578,066 B1 | * | 6/2003 | Logan et al. ................ | 709/105 |
| 2001/0034657 A1 | * | 10/2001 | Shuster et al. ............... | 705/26 |
| 2001/0039585 A1 | * | 11/2001 | Primak et al. .............. | 709/228 |
| 2002/0046293 A1 | * | 4/2002 | Kabata et al. .............. | 709/245 |
| 2003/0093523 A1 | * | 5/2003 | Cranor et al. ............... | 709/225 |

* cited by examiner

Primary Examiner—Dung C. Dinh
Assistant Examiner—Bradley Edelman
(74) Attorney, Agent, or Firm—Hamilton, Brook, Smith & Reynolds, P.C.

(57) ABSTRACT

A network operator identifies an address of a network element used by a particular client to obtain IP addresses. The client sends a test message to a test URL which includes a unique host name unknown to the client or network element. The network element accesses an authoritative server, which records the IP address of the requesting network element and resolves the host name in the test URL to a test IP address. The server records an IP address of the client when the client subsequently sends a message directly to the test IP address. In an alternative embodiment, another network node generates a redirect command, which incorporates the client IP address in a test URL, to allow for single-message determination of the network element and client IP addresses by the authoritative server. In both embodiments, user unique test URLs may be generated to allow the network operator to assist many users.

55 Claims, 6 Drawing Sheets

REMOTE IDENTIFICATION OF CLIENT AND DNS PROXY IP ADDRESSES

BACKGROUND OF THE INVENTION

A domain name system (DNS) allows Internet users to key a URL (Uniform Resource Locator) or domain name into the address line of their browser and access a corresponding server. An example of a URL is "http://www.foo.com", where http means Hypertext Transfer Protocol, www means World-Wide Web, foo is an example of a company name, .com means commercial (as opposed to .gov for government entities, .edu for education entities, .org for non-profit organizations, and so forth). An example of a host name in the URL is "www.foo.com". Progressing from left to right, the host name is structured from very specific to more general. Here, "www " is the name of the server that handles Internet requests and is sometimes referred to as a third-level domain name, "foo " is sometimes referred to as a second-level domain name, and "com " is sometimes referred to as a top-level domain name. The URL may also take on a form: "http://www.foo.com/1.gif", where the last field, 1.gif, indicates a file name, but may also be a Web page, executable application, or other computer readable or executable file located at the URL that the user wishes to access.

When the user enters the URL into a browser, the browser makes a determination as to whether it knows a corresponding IP (Internet Protocol) address. For example, a corresponding IP address for foo.com might be 255.122.37.124. The browser knows the corresponding IP address if that host name has been visited recently and the address is still in a short-term host name address table in the browser. The user may also store the host name-to-IP address correspondence in the browser in some other manner, such as in a so-called "favorites " log.

In a DNS-protocol network, such as the Internet, a common way for a browser to learn the IP address corresponding to the host name in a user-entered URL is for the browser to access a database in a DNS proxy, which is a form of a server that is tasked with resolving host names to IP addresses. DNS proxies are typically organized hierarchically on the Internet, where one DNS proxy may know a top-level domain address and lower level DNS proxies know subdomain addresses. Each DNS proxy has its own IP address on the Internet. The DNS proxy IP address is often unknown by the user since the Internet protocol enables the browser to access the DNS proxy in an automated manner, without requiring direction to the DNS proxy from the user.

A DNS proxy has limitations as to the number of host name-to-IP address mappings it can store. For this reason, the DNS proxy often accesses other network nodes that store the IP addresses for the host name, or portions thereof (e.g., the domain name and subdomain names). For example, if the DNS proxy were asked for the IP address of "www.foo.com", it may access an authoritative server that is responsible for storing the IP address of the foo.com domain name.

FIG. 1 provides a subset of the Internet 100 in which the above-described host name-to-IP address resolving process occurs. A user is operating a browser on the client machine 110. When the client 110 does not know an IP address of a host name residing on one of the servers 150, the client 110 issues a first message (step 1) to a DNS proxy 120.

Should the DNS proxy 120 not have the IP address for the URL in its address table, the DNS proxy issues a DNS request (step 2) to a central server 130 that is known to be authoritative for the host name in the URL. The central server 130 returns the corresponding IP address in an address record (step 3) to the DNS proxy 120. The DNS proxy 120 typically stores the corresponding IP address for a period of time and forwards it to the browser, which also stores the corresponding IP address. Using the corresponding IP address, the browser contacts the associated server (step 5) to access the user-specified URL. It should be understood that the URL may be located at multiple servers, and the DNS proxy 120 chooses the best server for the client, where choosing a best server is sometimes referred to as server selection.

Recently, content delivery systems have been added to the Internet to improve access time to information for clients. To access a content delivery system, a user merely types a URL into the browser, and the DNS system provides the corresponding IP address, as described above. Part of a content delivery system is a server selection subsystem. In server selection, a routed domain (a DNS domain and, implicitly, all its children) is redirected to one or more servers that can deliver the information requested. If there are problems with the way in which server selection is happening, it is possible that a user of the content delivery system could be directed to an inappropriate server, or that they are not being redirected to any servers at all. People noticing problems with the content delivery service contact a network operations center for the service provider to troubleshoot the problem.

A content delivery system may answer thousands of requests per second, providing redirection to a server that supports requested content. Although some diagnostic information may be logged on each such redirection, there is too much information logged to be able to understand it without some sort of filtering. Furthermore, the only identifying information available to the server selection system is the IP address of the network element requesting the redirection. This network element is typically the DNS proxy so the client is not visible to the server selection system. On the other hand, the DNS proxy is not visible to the end user during normal system operation. As a result, the network operator has a problem in starting the troubleshooting process. Although the redirecting system may be keeping logs of its actions with respect to each network element making requests, the end user calling with a problem typically does not know the address information of the relevant network element.

SUMMARY OF THE INVENTION

The present invention provides a means for the network operator, with the cooperation of the end user, to determine the address of the relevant network element. When a network operator is troubleshooting for a user who is having difficulty with a content delivery system or otherwise testing the system, it is important for the network operator to be able to determine the DNS proxy, or other network element used to obtain IP addresses, for that user. However, the user typically has no idea of the network address of their DNS proxy, and often does not know the IP address of his own network node (i.e., the client).

The present invention enables an operator to identify an address of a network element used by a particular client to obtain IP addresses. A user, operator, or other network node causes the client to send a test message to a test URL. The test URL includes a host name not known to the client or network element. Since neither the client nor the network element knows the corresponding IP address of the host-name in the test URL, the network element accesses a server known to be authoritative for the host name of the test URL. The server recognizes the test host name in a request from the network element and resolves the host name to an IP address. Also, the server registers the address of the network element making the request and optionally logs the network element DNS request. The test message may include a code in the host name of the test URL to identify the test message to the server. After registering the address of the network element making the request, the server hands back a test IP address for the client and records an IP address of the client when the client subsequently sends a message directly to the test IP address.

In an embodiment of the present invention, the user, network operator, or other network node causes the client to send the test message to a server, which, in turn, returns a redirect test message to redirect the client to the test URL. The server may parse the IP address of the client from the test message and incorporate the IP address of the client into the host name of the test URL, possibly with an encoded form of the IP address, which is decoded by the server. The client accesses the DNS proxy to get the IP address of the host name in the test URL, which accesses the authoritative server for the IP address of the host name in the test URL, since the host name in the test URL is designed to be unknown by the DNS proxy. By using the host name—of a host causing a problem for the user or to be identified for other reasons—as part of the host name in the test URL, the resolving process for the host name in the test URL is expected to traverse the same path (i.e., access the same DNS proxy) as is reported to be giving the user trouble. In both embodiments, user unique test URLs may be generated to allow the operator to assist many users.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 2:
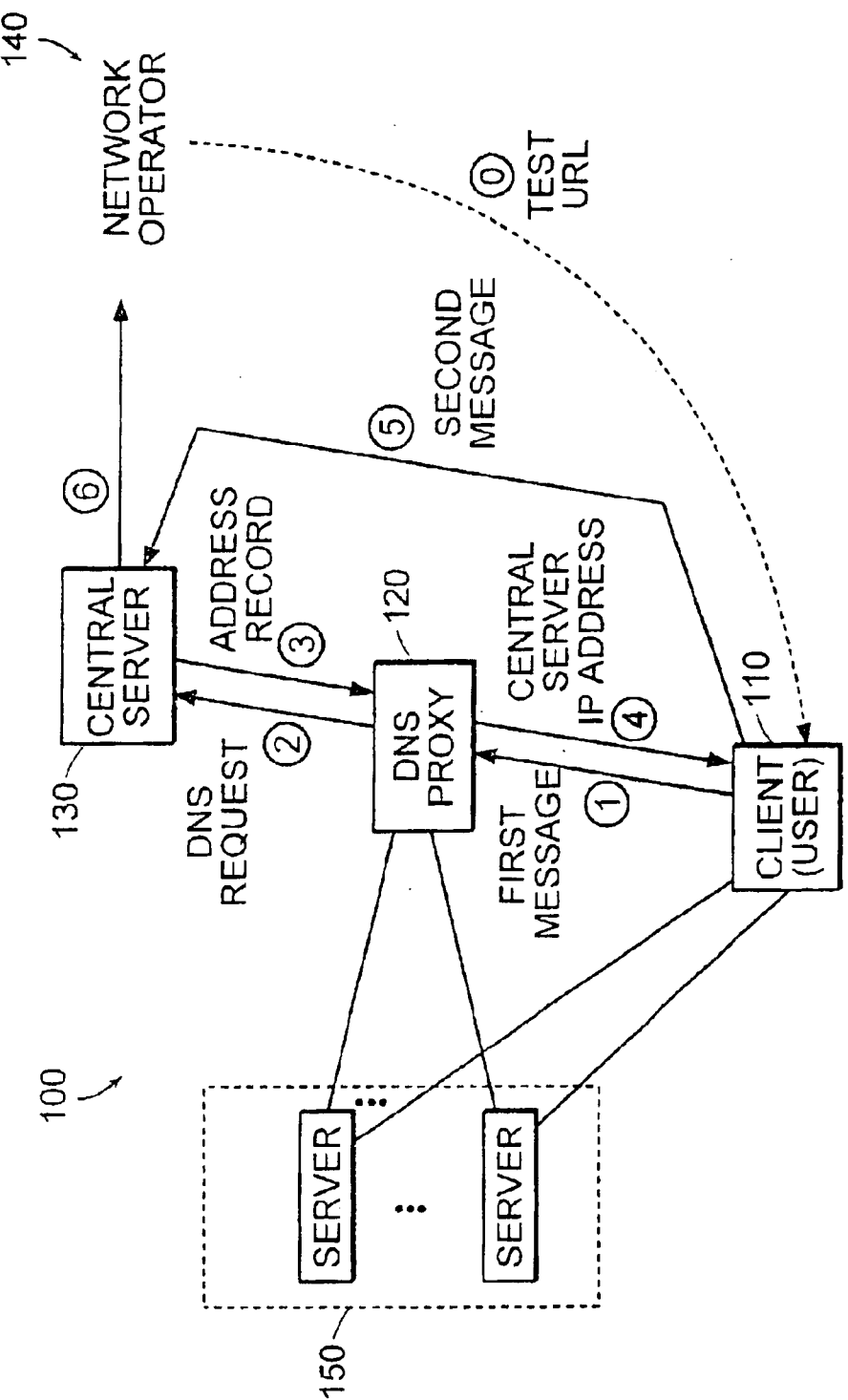
FIG. 2 is a block diagram of the prior art computer network of FIG. 1 in which the principles of the present invention now enable an operator to determine network addresses of a client and the DNS proxy.

FIG. 2 is a block diagram of a subset of a network model 100 comprising a portion of a content delivery system. The content delivery system includes servers 130 and 150, sometimes referred to as replica routers, which provide high speed data transfer for applications such as real-time video spooling. A user who wishes to receive data via the content delivery system need only type into a Web browser, operating on a client 110, a URL that corresponds to a Web page or other resource existing in or operating on one of the servers. If the browser has been to the host in the URL recently, the browser may have the corresponding IP address of the host in the URL in a local address table. Otherwise, the browser contacts a DNS proxy 120 that is expected to know the IP address corresponding to the host name in the URL. If the DNS proxy does not know the IP address for the host name in the URL, the DNS proxy accesses a server that is authoritative for the host name in the URL. In the example network, it is assumed that the central server 130 is authoritative for the host name in the URL.

If the DNS proxy fails to provide either an IP address or a correct IP address of a server, then the user calls a network operator 140 to investigate. To begin an investigation, the network operator may access a database in the central server or the DNS proxy, if accessible to the operator, to isolate the problem. Usually, however, a client does not know the IP address of the DNS proxy nor the IP address of his own network node, which are usually needed for the operator to begin the investigation. Therefore, to support the operator in determining the IP addresses of the DNS proxy and the client, the content delivery system makes available a collection of test URLs for testing or troubleshooting purposes.

The test URLs have host name component(s) that may be unique, unused for any other purpose, and contained within the routed domain to which the user is attempting to navigate (e.g., foo.com). Uniqueness can be imparted into a test URL while maintaining the same routed domain by adding one or more unique prefix fields to the host name. For example, "pseudo-random.foo.com" is unique, and so is "pseudo-random.pseudo-random.foo.com". In both cases, second level and top level domain names (i.e., foo.com) are the same and within the routed domain, so the client requests an IP address for foo.com from the same DNS proxy which is causing the user a problem. The DNS proxy contacts server or central server for resolution service for the foo.com domain. Since the DNS proxy contacts a server accessible by the network operator with the unique host name, the server identifies the message as containing a DNS proxy address to be collected for a network operator, which gives the operator some or all of the information needed to begin to troubleshoot the problem with the DNS proxy or server selection system.

The network operator can provide a test URL to the user by phone, email or on a web page to which the user can navigate. The user can type the test URL into a browser, cut and paste the test URL into the browser, or click on a link that includes the test URL. Since the test URL is unknown to the browser and DNS proxy, the browser requests the DNS proxy for the host name in the URL, which then accesses the central server to resolve the host name to a corresponding test IP address. The central server records the DNS proxy IP address and the host name and then returns the corresponding test IP address, which might be itself or any other machine, i.e., network node, that the central server can access. As a result, the browser goes to the machine with the test IP address for the URL. The machine then records the client machine's IP address. Then, the central server associates the client machine's IP address (the browser is running on the client machine) with the DNS proxy IP address that the central server recorded by, for example, identifying some common characteristic shared by the host name and the left part of the URL.

Alternatively, the user may be instructed to send a message to a Web server that parses the message to determine the IP address of the client. The Web server then includes the client IP address into a host name of a test URL, which is packaged in a redirect message and sent back to the client. The client accesses the DNS proxy to get the IP address of the host name in the test URL in the redirect message, which causes the unique host name to reach the central server, as above, but with the IP address of the client in the unique host name.

In both embodiments of the present invention, user unique test URLs may be generated to allow an operator to assist many users at a time. The number of test URLs may be randomly or pseudo-randomly generated so that the test URLs do not repeat for long periods of time. Further, whenever a test URL has been created, the applicable network nodes are informed of the existence of the new test URL so that the test URL is identified by the content delivery system or, in another embodiment, network nodes outside a content delivery system. An important aspect of the diagnostic mechanism is that it requires no more knowledge of user interfaces or network configurations than the end user must already have mastered to take advantage of Web content, including content delivered via the content delivery system or other typical network arrangement.

Figure 3:
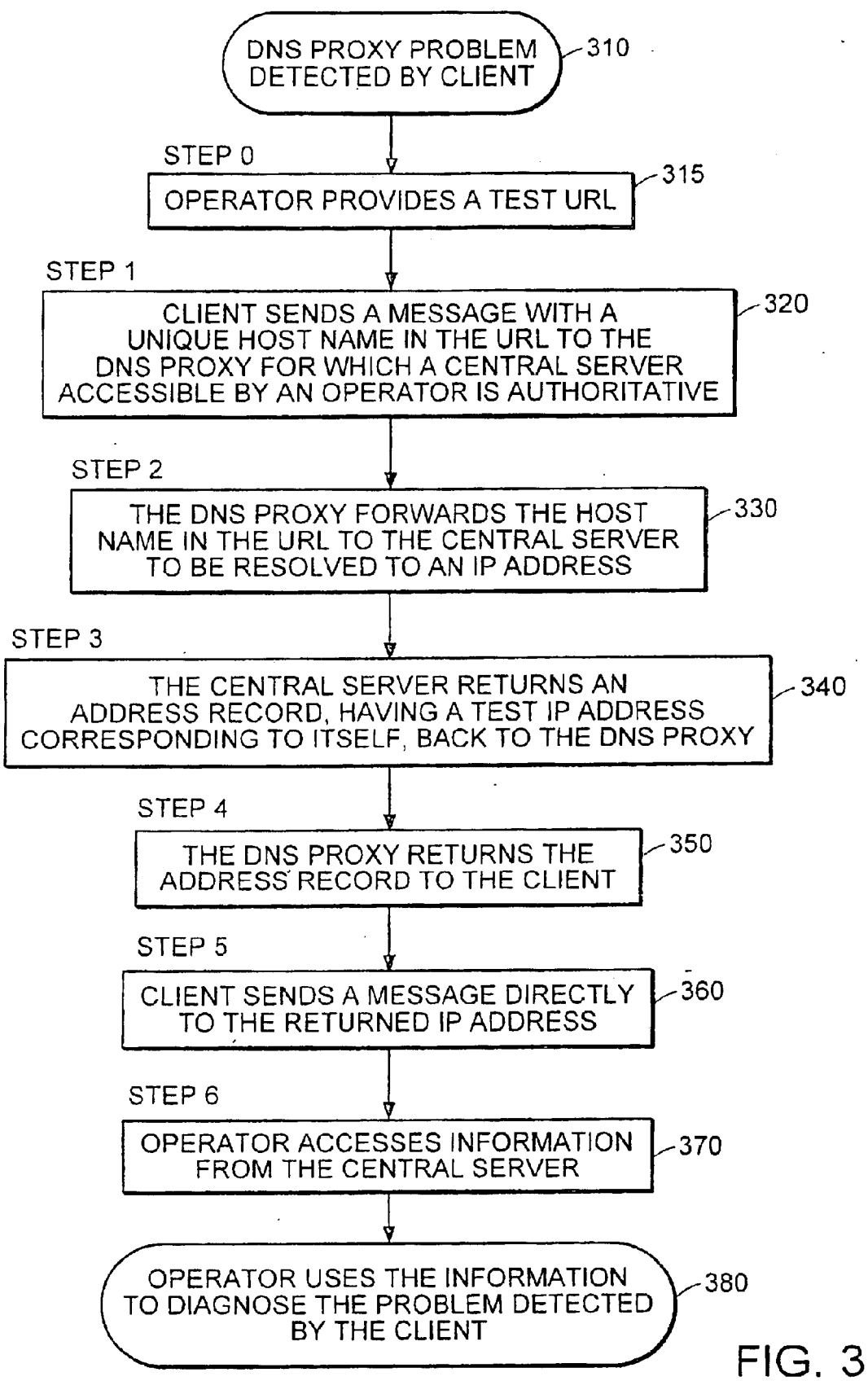
FIG. 3 is a flow diagram of an embodiment of a process for determining the network addresses of the client and DNS proxy of FIG. 2.

A process for executing a determination of the DNS proxy IP address is enumerated along the several paths among the system elements in FIG. 2, and described by a process embodied in a flow diagram of FIG. 3. Referring to FIG. 3, in step 310, the client determines a problem with the DNS proxy and contacts the network operator to assist in fixing the problem. In step 315 (FIG. 2, step 0), the network operator provides a test URL to the user as described above. In step 320 (FIG. 2, step 1), the client sends a message with a unique host name in the test URL to the DNS proxy for which a server accessible by the operator is authoritative (i.e., can resolve the host name to a corresponding test IP address). In step 330 (FIG. 2, step 2), the server receives and logs the received message, and, in particular, the IP address of the forwarding DNS proxy. In at least one embodiment, the central server, which is part of the content delivery system, performs many steps beyond resolving the host name in the test URL in response to receiving the host name.

When the content delivery system is asked to resolve the host name in a test URL, the content delivery system takes two actions: First, it records the IP address of the device requesting resolution. This is the network element that could not otherwise be identified (e.g., the DNS proxy). Second, it resolves the host name to its own IP address, so that any subsequent HTTP request will be sent to it. An embodiment of a process executed in the central server is shown in the flow diagram of FIG. 4.

Figure 4:
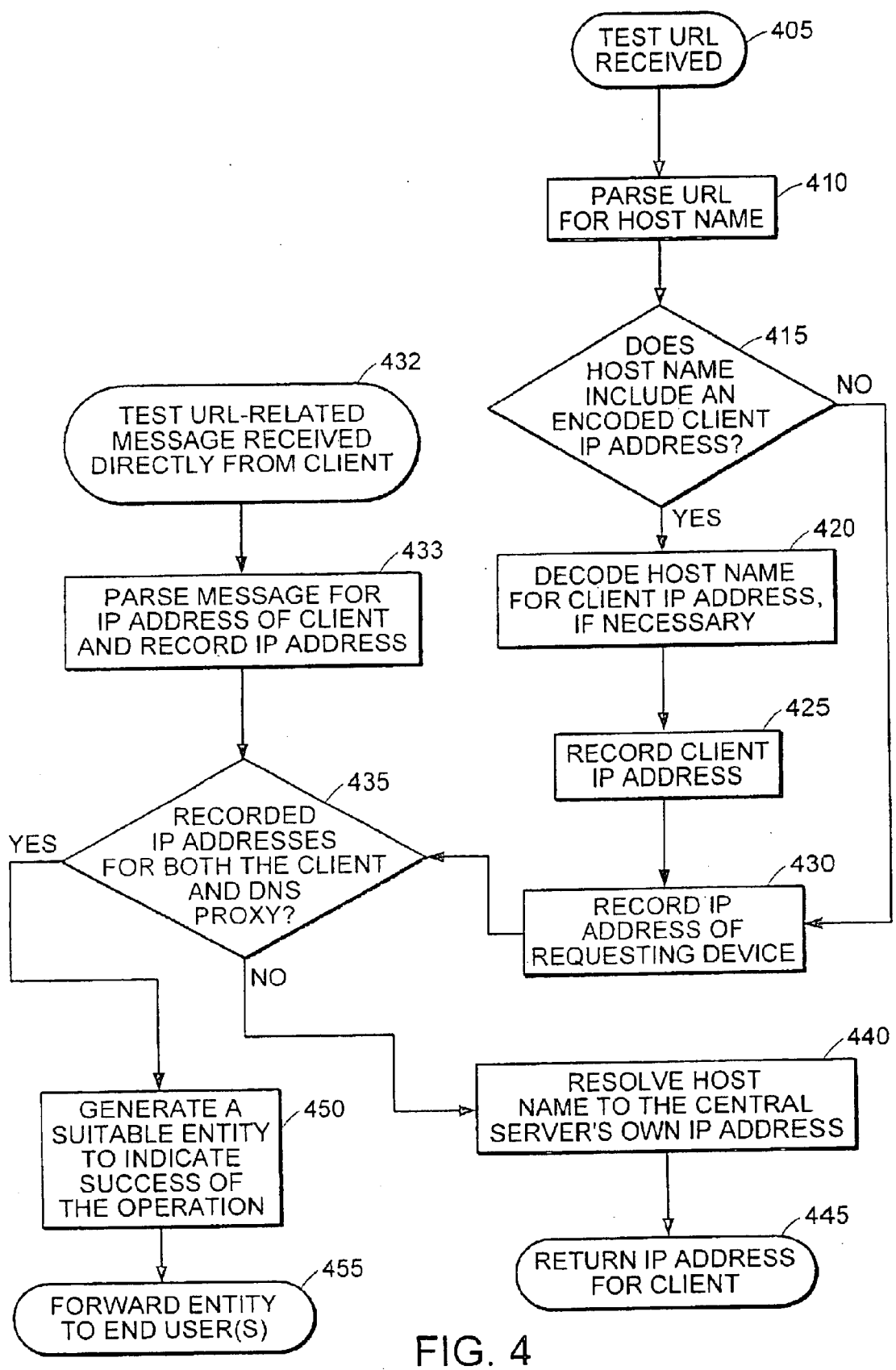
FIG. 4 is a flow diagram of a process executed by a central server of FIG. 2.

FIG. 4 is a flow diagram of a process executed by the central server upon receiving the test URL in step 405. In step 410, the central server parses the test URL for the host name. In step 415, a query determines whether the host name includes an encoded form of the client IP address. An encoded form of an IP address is used in an embodiment of the present invention in connection with FIG. 5, described below. If the host name includes an encoded form of the client IP address, then steps 420 and 425 are executed, in which the central server decodes the host name to determine the client IP address and then records the client IP address. After step 425, and if the host name does not include an encoded client IP address, the process records the IP address of the requesting device, which is the DNS proxy in this case. If the query of step 435 determines that both the client and requesting device addresses have been recorded, then in step 450, the process generates a suitable entity to indicate the success of the operation. In step 455, the central server forwards the entity to the end user(s). If the query of step 435 determines that only the IP address of the requesting device has been recorded, then the process resolves the host name to the central server's own IP address, which gets returned to the requesting device for the client in step 445.

Referring again to FIG. 3, in step 340 (FIG. 2, step 3), the central server returns an address record, having a test IP address corresponding to itself, back to the DNS proxy. In step 350 (FIG. 2, step 4), the DNS proxy returns the address record to the client. In step 360 (FIG. 2, step 5), the client sends a message directly to the central server, via HTTP or other transport protocol, by using the IP address of the central server corresponding to the test URL.

After the content delivery system is contacted directly by the client via HTTP to fetch the resource named by the test URL, the content delivery system takes two actions. Referring again to FIG. 4, first, in step 433, the process records the IP address of the device requesting the resource, which is the client device 110 (FIG. 2) for the end user requesting assistance. Second, since both IP addresses of the client and DNS proxy have now been recorded, in step 450, the process executed by the central server now serves up some suitable entity, such as an HTML page, which optionally contains diagnostic or contact information to confirm the success of the operation to the end user(s). The end user may be either or both the user or operator, or other network node with which either end user has access. The end user(s) receive or access the entity in step 455 (steps 370, FIG. 3 and step 6, FIG. 2). The resulting information (date/time of DNS resolution; IP address of requester; date/time of HTTP GET; IP address of the "getter") in the entity is then made visible to the operator, who can use it to key into logs maintained by the content delivery system or access other diagnostic and troubleshooting tools available in the network operations center.

The process described in FIGS. 2–4 is vulnerable to errors if more than one end user is fetching the diagnostic resource at the same time. Diagnostic-only URLs may be supported. Diagnostic-only URLs may be generated automatically by the content delivery system (so that each troubleshooting incident creates a fresh URL) or may be predefined by an operator as a large fixed set of such URLs, with allocation of URLs-to-incidents managed so that a long time passes between incidents using the same URL. Alternatively, the content delivery system may generate a random or pseudo-random host name to be included in the test URL when the operator instantiates a new test or troubleshooting session.

Figure 5:
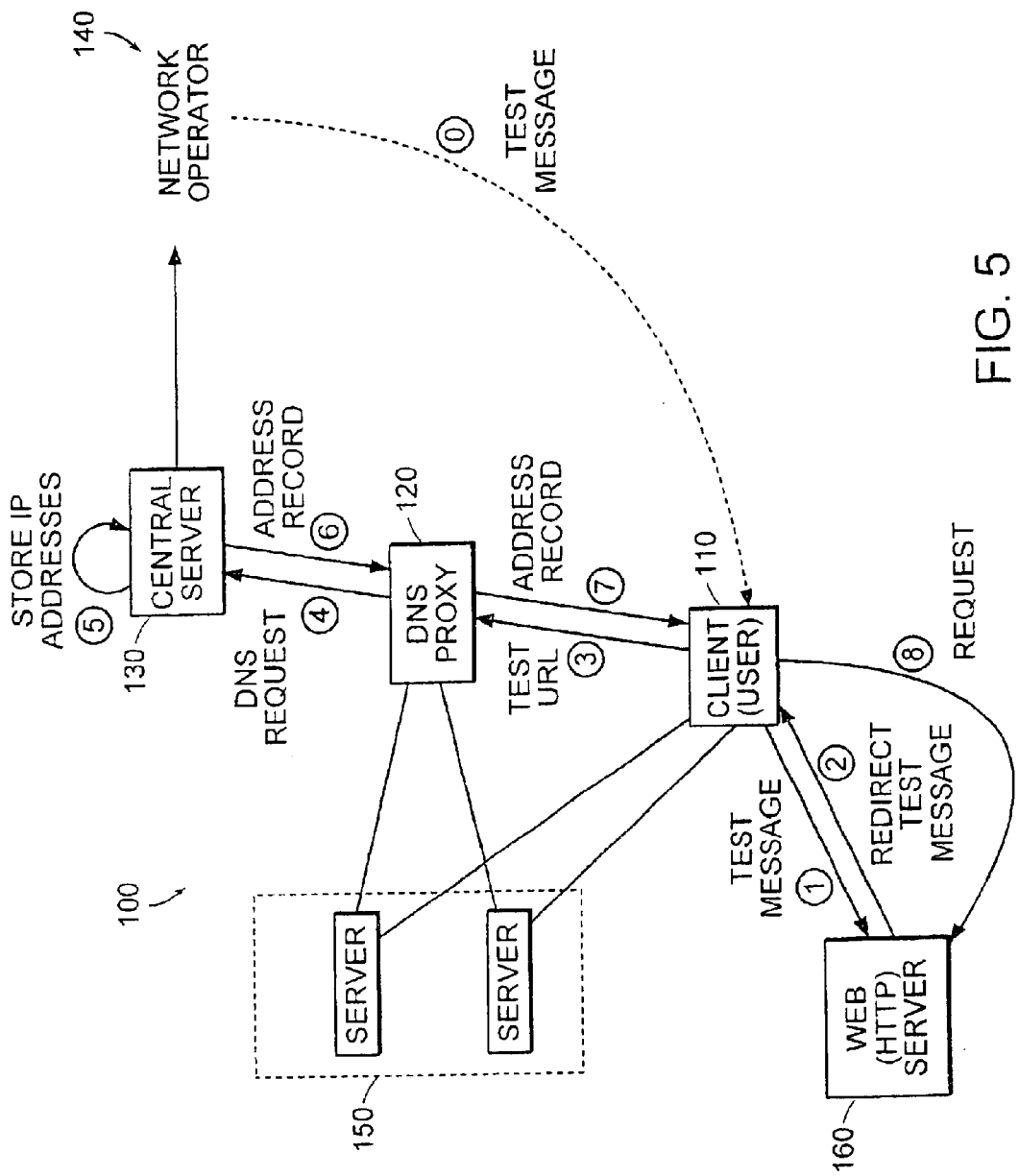
FIG. 5 is a block diagram of the computer network of FIG. 2 further including a Web server (e.g., HTTP server) employed by an alternate embodiment of the present invention.

In the process described in FIGS. 2–4, two separate communications are required from the client to the central server. In an alternative embodiment, it is possible that a single communication from the client to the central server may be employed to enable the central server to determine the IP addresses of the DNS proxy and the client. FIG. 5 is a block diagram, similar to FIG. 2, which includes a Web server 510 to support a single communication technique for the central server to learn the IP addresses of the client 110 and DNS proxy 120. The client sends a test message to the Web server. The Web server supports a process for detecting a test or troubleshooting message (e.g., HTTP message) and generating a test or troubleshooting URL that engages the DNS proxy experiencing the user-detected problem. It should be understood that the Web server may be any node executing the computer program instructions supporting this alternate embodiment.

Figure 1:
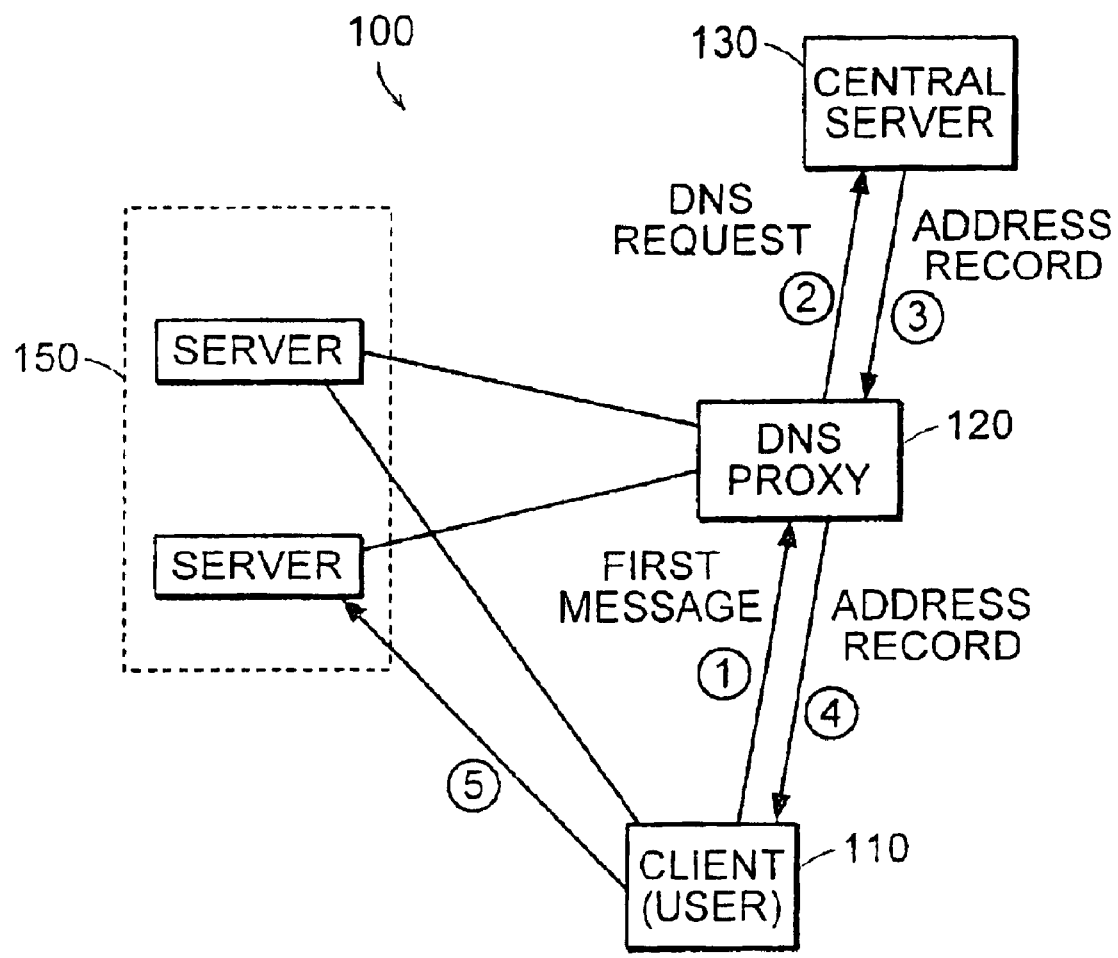
FIG. 1 is a block diagram of a prior art computer network comprising a DNS proxy.

Similar to FIG. 1, FIG. 5 includes an enumerated set of steps that form the process for determining the IP addresses of the DNS proxy and the client machine in a single communication between the client and the central server. Steps 0, 3, 4, 6, and 7 were discussed in reference to FIGS. 2 and 3. Step 5 takes advantage of steps 420–435 and 450–455 of FIG. 4, which were discussed above. Steps 1 and 2 of FIG. 5, however, are different from the embodiment of FIG. 2 and are the subject of the process of FIG. 6.

Figure 6:
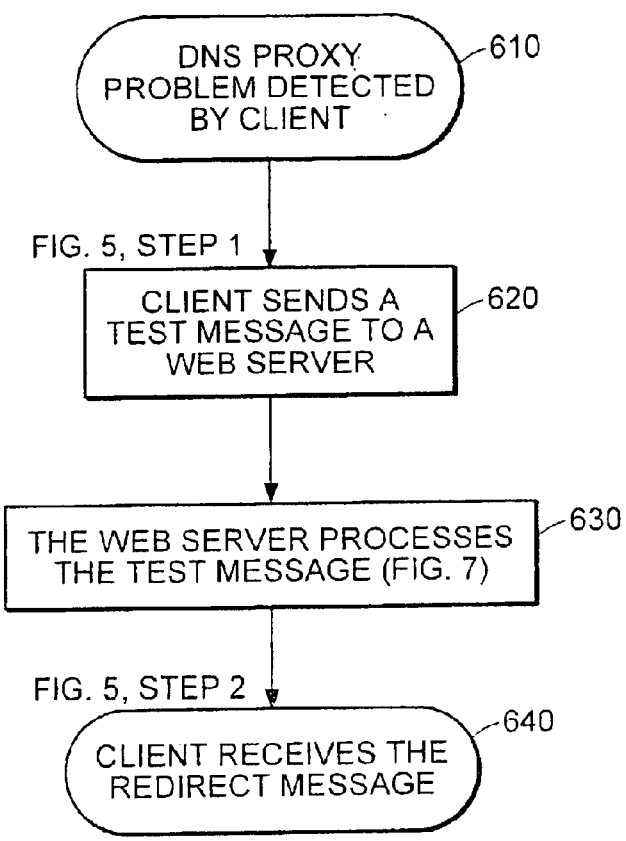
FIG. 6 is a flow diagram of a process occurring between the client and Web server of FIG. 5.

Referring to FIG. 6, the process begins in step 610 with the client reporting a DNS proxy problem to the network operator, who, in turn, provides a message for the client to send to a Web server (FIG. 5, step 0). In step 620 (FIG. 5, step 1), the client sends the message to the Web server. The message is sent to a URL, which may employ common gateway interfaces (cgi) used to pass a user's request to an application program and to receive data back to forward to the user, having the form "http://subserver/cgi-bin/DNS-cgi". In step 630, the Web server processes the test message. The processing steps are outlined in FIG. 7 and discussed immediately below.

Figure 7:
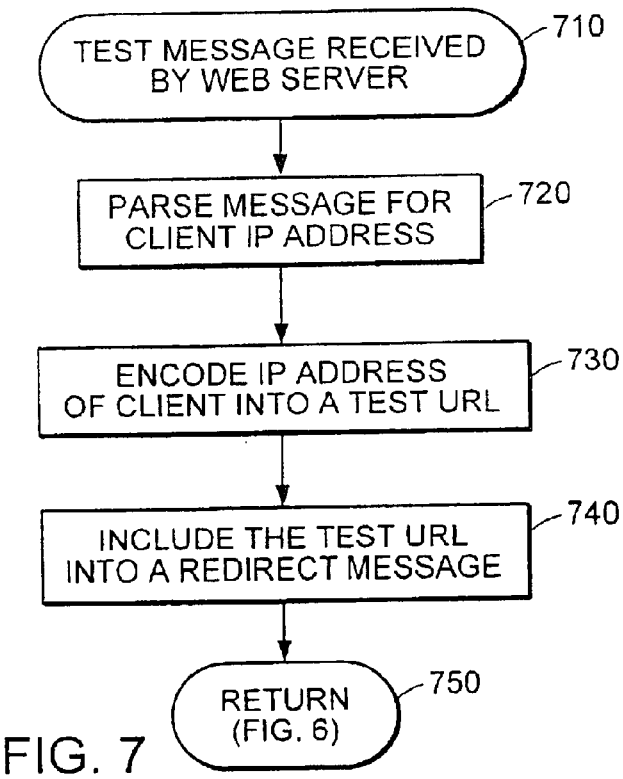
FIG. 7 is a flow diagram of a process executed by the Web server of FIG. 5.

Referring to FIG. 7, the Web server receives the test message in step 710. In step 720, the Web server parses the received message for the IP address of the client. In step 730, the process encodes the IP address of the client into a test URL. It should be noted that various standard forms of encoding the client IP address into a host name of the test URL may be employed, including incorporating the IP address into the host name without encoding it per se. The test URL is then embodied into a redirect message and sent to the client. In step 750, the process ends and processing continues at step 640 of FIG. 6 (FIG. 5, step 2). In response to step 640, the client gets redirected by the DNS-cgi to "http://client-IP.uniqueID.dns.foo.com/1.gif". The redirect command causes the client machine to access the DNS proxy, in step 3 of FIG. 5, to request the "client-IP.uniqueID.dns.foo.com" address.

Upon receiving the "client-IP.uniqueID.dns.foo.com" URL, the central server (i) parses the URL to determine the client-IP, uniqueID, and DNS proxyID information, and (ii) saves that information in a database. At this point, the operator can get both the DNS proxy and client IP addresses from the single communication. In step 8, the client fetches the 1.gif information from the Web server. An example for "http://client-IP.uniqueID.dns.foo.com" is "http://208.73.65.70.17564592.DNS.foo.com".

It should be understood that the processes described herein may be implemented in computer program instructions executable by a processor. The computer program instructions may be stored on a computer readable medium, such as RAM, ROM, CD-ROM, floppy disk, magnetic storage medium. The storage medium may be local to the processor executing the computer program instructions or remote from the processor, in which case the computer program instructions are provided to the processor across a network.

The central server 130 is part of a network of hundreds or thousands of servers composing the content delivery system, which also includes the servers 150. For more information about the content delivery system, see the following patent applications: U.S. application Ser. No. 08/779,770 filed Jan. 7, 1997 entitled "Replica Routing", now U.S. Pat. No. 6,052,718, U.S. application Ser. No. 09/294,836 filed Apr. 19, 1999 entitled "Methods and Apparatus for Remote Configuration of an Appliance on a Network", now U.S. Pat. No. 6,345,299, U.S. application Ser. No. 09/294,837 filed Apr. 19, 1999 entitled "Methods and Apparatus for Routing Requests in a Network", now U.S. Pat. No. 6,505,254, U.S. Provisional Application No. 60/160,535 filed Oct. 20, 1999 entitled "Automatic Network Address Assignment and Translation Inference", U.S. Provisional Application No. 60/177,415 filed Jan. 21, 2000 entitled "Method and Apparatus for a Minimalist Approach to Implementing Server Selection", U.S. Provisional Application No. 60/178,062 filed Jan. 24, 2000 entitled "Method and Apparatus for Determining a Network Topology in the presence of Network Translation", U.S. Provisional Application No. 60/178,063 filed Jan. 24, 2000 entitled "Method and Apparatus for Automatic Network Address Assignment", U.S. Provisional Application No. 60/177,985 filed Jan. 25, 2000 entitled "Fast-Changing Network Status and Load Monitoring and Feedback", U.S. application Ser. No. 09/535,279 filed Mar. 24, 2000 entitled "Method and Apparatus for Automatic Network Address Assignment", and U.S. application Ser. No. 09/642,165 filed Aug. 18, 2000 entitled "A Minimalist Approach to Implementing Server Selection Through Use of Server Measurements to DNS Proxies." The teachings of all are incorporated herein by reference in their entirety.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for identifying an address of a network element that a particular client uses to obtain IP addresses, comprising:

causing the client to send a test message destined for a test URL to a network element, the test URL including a host name at least in part distinguishable from host names in non-test URLs according to a predetermined uniqueness and not known to the client or network element but for which a test server is known to be authoritative, the network element responsively accessing the test server; and at the test server, recognizing the predetermined uniqueness in the host name of the test URL received in a request from the network element to resolve the host name in the test URL to an IP address, and responsively (i) distinguishing the request from requests including non-test URLs, (ii) identifying the address of the network element used by the client to obtain the IP address, and (iii) registering the address of the network element making the request.

2. The method according to claim 1 wherein registering comprises logging the network element IP address.

3. The method according to claim 1 wherein the test message includes a code in the host name of the test URL to identify the test message to the server.

4. The method according to claim 1 further comprising, at the test server, (i) handing back a test IP address for the client and (ii) recording an IP address of the client when the client subsequently sends a message directly to the test IP address.

5. The method according to claim 4 wherein the test message comprises a code in the host name of the test URL to identify the test message to the server.

6. The method according to claim 1 wherein the client is caused to send the test message in response to a non-test server sending a redirect test message to the client, the redirect test message redirecting the client to the test URL.

7. The method according to claim 6 wherein the redirect test message comprises the client IP address in the host name of the redirect test message.

8. The method according to claim 7 further comprising causing the client to send a preliminary test message to the non-test server which results in the non-test server sending the redirect test message, wherein the redirect test message includes the client IP address from the preliminary test message.

9. The method according to claim 7 further comprising encoding the client IP address in the host name of the test URL.

10. The method according to claim 1 wherein the test URL is unique.

11. A system for identifying an address of a network element that a particular client uses to obtain IP addresses, comprising:
a client caused to send a message destined for a test URL to a network element, the test URL including a host name at least in part distinguishable from host names in non-test URLs according to a predetermined uniqueness and not known to the client or network element, the network element responsively accessing an authoritative server; and
a server that (i) is the authoritative server for the host name in the test URL, (ii) recognizes the predetermined uniqueness in the host name of the test URL in a request from the network element to resolve the host name of the test URL to a test IP address, and (iii) responsively (a) distinguishes the request from requests including non-test URLs, (b) identifies the address of the network element making the request, and (c) registers the address of the network element making the request.

12. The system according to claim 11 wherein the server comprises a log for storing the network element IP address.

13. The method according to claim 11 wherein the test message includes a code in the host name of the test URL to identify the test message to the server.

14. The system according to claim 11 wherein the server (i) hands back the test IP address for the client and (ii) records an IP address of the client when the client subsequently sends a message directly to the test IP address.

15. The system according to claim 14 wherein the test message comprises a code in the host name of the test URL to identify the test message to the server.

16. The system according to claim 11 wherein the client is caused to send the test message in response to a non-test server sending a redirect test message to the client, the redirect test message redirecting the client to the test URL.

17. The system according to claim 16 wherein the redirect test message comprises the client IP address in the host name of the redirect test message.

18. The system according to claim 17 wherein the client sends a preliminary test message to the non-test server which results in the non-test server sending the redirect test message, wherein the redirect test message includes the client IP address from the preliminary test message.

19. The system according to claim 17 further comprising encoding the client IP address in the host name of the test URL.

20. The system according to claim 11 wherein the test URL is unique.

21. An apparatus for identifying an address of a network element that a particular client uses to obtain IP addresses, comprising:
an interface coupled to a network to receive client messages, and
a processor coupled to the interface, the processor executing a set of computer program instructions, the computer program instructions:
receiving a request from a network element in response to the network element receiving a test message destined for a test URL from a client, the test URL including a host name at least in part distinguishable from host names in non-test URLs according to a predetermined uniqueness and not known to the client or network element but for which the apparatus is known to be authoritative; and
recognizing the predetermined uniqueness in the host name of the test URL in the request from the network element to resolve the host name to an IP address and responsively (i) distinguishing the request from requests including non-test URLs, (ii) identifying the address of the network element used by the client to obtain the IP address, and (iii) registering the network element making the request.

22. The apparatus according to claim 21 further comprising memory coupled to the processor for the processor to log the network element IP address.

23. The apparatus according to claim 21 wherein the test message includes a code in the host name of the test URL to identify the test message to the server.

24. The apparatus according to claim 21 wherein the executable instructions further include instructions to (i) hand back a test IP address for the client and (ii) record an IP address of the client when the client subsequently sends a message directly to the test IP address.

25. The apparatus according to claim 24 wherein the test message comprises a code in the host name of the test URL to identify the test message to the server.

26. The apparatus according to claim 21 wherein the instructions further comprise instructions to cause the client to send the test message in response to a non-test server sending a redirect test message to the client, the redirect test message redirecting the client to the test URL.

27. The apparatus according to claim 26 wherein the redirect test message comprises the client IP address in the host name of the redirect test message.

28. The apparatus according to claim 27 wherein the instructions further comprise instructions to cause the client to send a preliminary test message to the non-test server which results in the non-test server sending the redirect test messages, wherein the redirect test message includes the client IP address from the preliminary test message.

29. The apparatus according to claim 27 further comprising instructions to decode the client IP address from the host name of the test URL.

30. The apparatus according to claim 21 wherein the test URL is unique.

31. In a server, a method for identifying an address of a network element that a particular client uses to obtain IP addresses, comprising:
receiving a request from a network element in response to the network element receiving a test message destined for a test URL from a client, the test URL including a host name at least in part distinguishable from host names in non-test URLs according to a predetermined uniqueness and not known to the client or network element but for which the server is known to be authoritative; and recognizing the predetermined uniqueness in the host name in the test URL received in a request from the network element to resolve the host name to an IP address and responsively (i) distinguishing the request from requests including non-test URLs, (ii) identifying the address of the network element used by the client to obtain the IP address, and (iii) registering the address of the network element making the request.

32. The method according to claim 31 further comprising logging the network element IP address.

33. The method according to claim 31 wherein the test message includes a code in a host name of the test URL to identify the test message to the server.

34. The method according to claim 31 further including, at the server, (i) handing back a test IP address for the client and (ii) recording an IP address of the client when the client subsequently sends a message directly to the test IP address.

35. The method according to claim 34 wherein the test message comprises a code in the host name of the test URL to identify the test message to the server.

36. The method according to claim 31 further comprising causing the client to send the test message in response to a non-test server sending a redirect test message to the client, the redirect test message redirecting the client to the test URL.

37. The method according to claim 36 wherein the redirect test message comprises the client IP address in the host name of the redirect test message.

38. The method according to claim 37 further comprising causing the client to send a preliminary test message to the non-test server which results in the non-test server sending the redirect test message, wherein the redirect test message includes the client IP address from the preliminary test message.

39. The method according to claim 37 further comprising decoding the client IP address from the host name of the test URL.

40. The method according to claim 31 wherein the test URL is unique.

41. A computer program product comprising:
a computer usable medium for storing data; and
a set of computer program instructions embodied on the computer useable medium, including instructions to:
receive a request from a network element in response to the network element receiving a test message destined for a test URL from a client, the test URL including a host name at least in part distinguishable from host names in non-test URLs according to a predetermined uniqueness and not known to the client or network element but for which a server executing the computer program instructions is known to be authoritative; and
recognize the predetermined uniqueness in the host name in the test URL received in the request from the network element to resolve the host name to an IP address and responsively (i) distinguishing the request from requests including non-test URLs, (ii) identifying the address of the network element used by the client to obtain the IP address, and (iii) registering the address of the network element making the request.

42. The computer program product according to claim 41 further comprising instructions to log the network element IP address.

43. The computer program product according to claim 41 wherein the test message comprises a code in the host name of the URL to identify the test message to the server.

44. The computer program product according to claim 41 further comprising instructions to (i) hand back a test IP address for the client and (ii) recording record an IP address of the client when the client subsequently sends a message directly to the test IP address.

45. The computer program product according to claim 44 wherein the test message comprises a code in the host name of the test URL to identify the test message to the server.

46. The computer program product according to claim 41 wherein the instructions further comprise instructions to cause the client to send the test message in response to a non-test server sending a redirect test message to the client, the redirect test message redirecting the client to the test URL.

47. The computer program product according to claim 46 wherein the redirect test message comprises the client IP address in the host name of the redirect test message.

48. The computer program product according to claim 47 wherein the instructions further comprise instructions to cause the client to send a preliminary test message to the non-test server which results in the non-test server sending the redirect test message, wherein the redirect test message includes the client IP address from the preliminary test message.

49. The computer program product according to claim 47 further comprising instructions to decode the client IP address from the host name of the test URL.

50. The computer program product according to claim 41 wherein the test URL is unique.

51. A method for assisting to identify an address of a network element that a particular client uses to obtain IP addresses, comprising:
receiving a message from a client;
parsing the message for an IP address of the client and encoding the client IP address into a host name for a test URL, the test URL including the host name not known to the client or network element used by the client but for which a test server is authoritative; and
returning the test URL to the client in a redirect test message, the redirect test message causing the client to send a non-redirect test message to the network element to make a request of the test server to resolve the host name in the test URL to a test IP address.

52. An apparatus for identifying an address of a network element that a particular client uses to obtain IP addresses, comprising:
means for receiving a message from a client;
means for parsing the message for an IP address of the client and encoding the client IP address into a host name for a test URL, the test URL including the host name not known to the client or network element used by the client but for which a test server is authoritative; and
means for forwarding the test URL back for the client in a redirect test message, the redirect test message causing the client to send a non-redirect test message to the network element to make a request of the server to resolve the host name in the test URL to a test IP address.

53. A communication signal on a carrier wave, the communication signal for identifying an address of a network element that a particular client uses to obtain IP addresses, and the communication signal adapted to being passed between the client and the network element, the signal including a test URL comprising a host name, at least in part distinguishable from host names in non-test URLs according to a predetermined uniqueness and not known to the client or network element but for which a test server is known to be authoritative, the signal causing the network element to resolve the host name in the test URL by accessing the test server that (a) recognizes the predetermined uniqueness in the host name of the test URL received in a request from the network element to resolve the host name in the test URL to an IP address, and (b) responsively (i) distinguishes the request from requests including non-test URLs, (ii) identifies the address of the network element used by the client to obtain the IP address, and (iii) registers the address of the network element making the request.

54. The signal according to claim 53 wherein the host name of the test URL comprises an encoded IP address of the client.

55. The signal according to claim 53 wherein the test URL is unique.

* * * * *